J. W. MÜLLER.
AUTOMATIC MILK CAN FILLER.
APPLICATION FILED MAR. 28, 1912.
1,049,901. Patented Jan. 7, 1913.
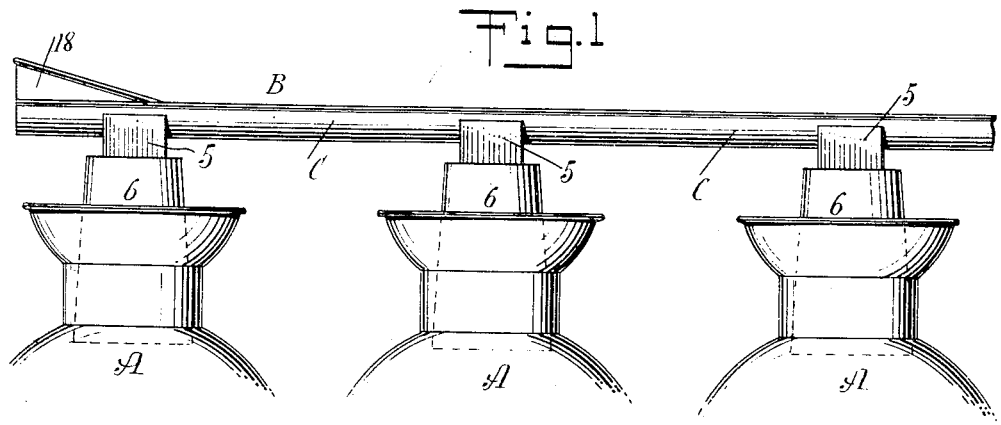
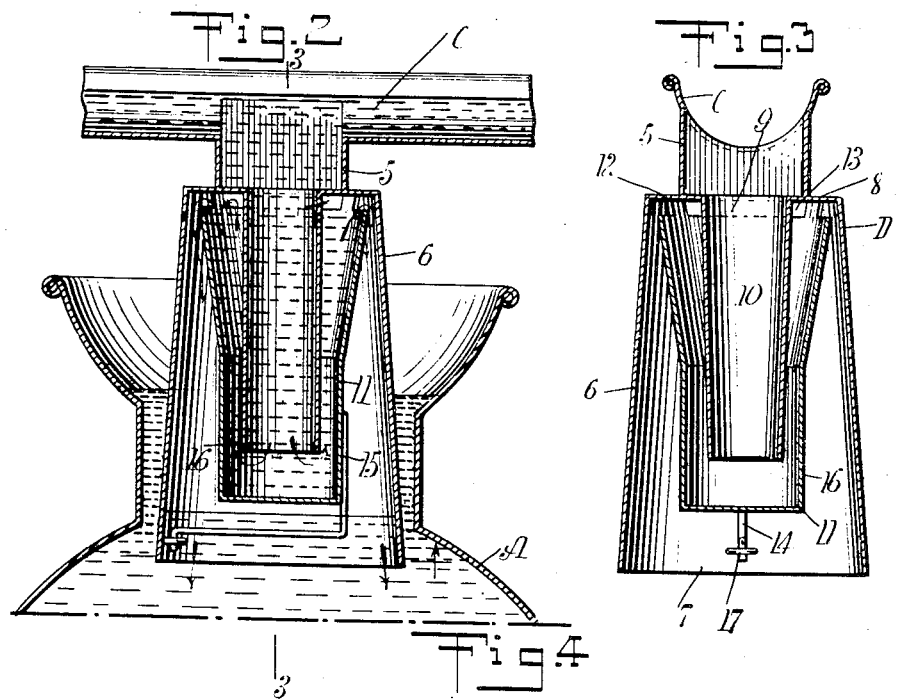
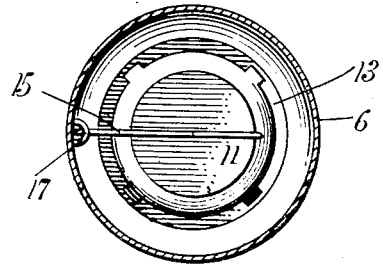
WITNESSES
INVENTOR
Joseph W. Müller
BY Munn & Co
ATTORNEYS

UNITED STATES PATENT OFFICE.

JOSEPH WILLIAM MÜLLER, OF CHEHALIS, WASHINGTON.

AUTOMATIC MILK-CAN FILLER.

1,049,901.

Specification of Letters Patent.

Patented Jan. 7, 1913.

Application filed March 28, 1912. Serial No. 686,792.

*To all whom it may concern:*

Be it known that I, JOSEPH W. MÜLLER, a citizen of the United States, and a resident of Chehalis, in the county of Lewis and State of Washington, have invented a new and Improved Automatic Milk-Can Filler, of which the following is a full, clear, and exact description.

My invention relates to an automatic milk-can filler, and an object of my invention is to provide a means for filling milk cans, bottles or other receptacles in succession, the milk flowing into the first of a series of cans or receptacles, and when said first can is filled, the milk is automatically shut off from this filled can and permitted to flow into the next can of the series and so on successively to the end of the series of cans.

A further object of my invention is to provide a simplified form of filling device containing relatively few parts.

I attain the above outlined objects by positioning in each of the series of milk cans or similar receptacles, a trap connected to a source of supply, so arranged that when the milk can is filled to a predetermined level, the pressure of air confined within said trap will intercept the passage of any more milk into that can and permit the milk to flow into the next adjacent can of the series.

Reference is to be had to the accompanying drawings, forming a part of this specification, in which similar characters of reference indicate corresponding parts in all the figures, and in which—

Figure 1 is a side elevation of a preferred embodiment of my invention, showing the same disposed in the throats of a series of milk cans; Fig. 2 is a vertical fragmentary sectional view taken longitudinally through a preferred embodiment of my invention and shown positioned in the throat of a milk can; Fig. 3 is a transverse sectional view taken on the line 3—3 of Fig. 3, but detached from the can; and Fig. 4 is a bottom view of the trap shown in Fig. 3.

Described more in detail, I have shown a series of milk cans A arranged in alinement, extending over which cans is a filling device B, comprising a substantially U-shaped filling trough C, along which trough fluid is introduced into the cans A through a trap D, said trap more particularly forming the subject-matter of my invention.

Preferably forming an integral part of the trough C and depending therefrom, is a collar 5 rigidly affixed to the upper smaller end of a frusto-conical bell 6, the lower open end 7 of which is inserted within the can A and below the level of the milk when said can is filled. The smaller upper end of the bell 6 has an integral head 8 closing the same, centrally positioned in which is an opening 9 concentrically disposed relative to the collar 5, which opening is outlined by the upper end of an open-ended tube 10 integral with the head 8 and depending into the bell 6 for a distance approximately two-thirds of its length. Positioned within the bell 6, telescoping the tube 10, and having its bottom positioned some material distance below the open end of the tube 10 and above the open end 7 of the bell 6, is a trap member 11 arranged in the form of a closed-end funnel, the upper edge 12 of which has a series of recesses 13 therein to form outlets for a purpose hereinafter described. The trap member 11 is removably held in place with its upper edge 12 in engagement with the head 8, by means of a wire bracket 14 fastened at 15 to the cylindrical portion 16 of the member 11, extending beneath said member and removably mounted in a suitable I-bracket 17 positioned on the inner wall and adjacent the lower end of the bell 6.

By the above outlined construction, it will be seen that milk poured into one end of the trough C, preferably into the end having the funnel 18, will flow through the collar 5 and tube 10, into the trap member 11. Filling this trap member, the milk will flow through the openings 13 into the first can A of the series through the bell 6, and the rising milk will gradually compress the air in the bell 6 until this compressed air exceeds the pressure of the atmosphere by the weight of the column of milk measured from where the milk overflows the trap 11 to the level of the milk in the trough C. This, of course, will intercept the passage of milk permitting it to flow on into the next succeeding can, filling this second can as has been described with reference to the first can, and so on through the series of cans, filling each one in succession.

The milk may be removed from the trap member 11 and the device readily cleaned by disconnecting this trap member from the bell 6, this being facilitated by means of a wire bracket connection 14 with the bracket 17.

Having thus described my invention, I claim as new and desire to secure by Letters Patent:

1. In a device of the character described, a trough formed with a plurality of apertures in the bottom thereof, means for directing fluid to said trough, a hollow frusto-conical member formed with an open bottom, a neck smaller than the top of the frusto-conical member connecting said frusto-conical member and said trough, said neck inclosing one of the openings in the trough, a depending tube extending from said neck open at both ends, and a cup-shaped member fitting over said tube, said cup-shaped member being closed at the bottom and formed with a plurality of openings at the top.

2. In a device of the character described, a distributing trough formed with a plurality of openings, a depending neck surrounding each of said openings, a frusto-conical member depending from each of said necks, a tube open at both ends depending from the upper end of said frusto-conical member and in free communication with said neck, said frusto-conical member being open at the bottom, a cup-shaped member open at the top fitting over said tube and arranged so that the bottom thereof will be spaced from the bottom of the tube, said top being formed with openings whereby matter flowing through said tube will fill said cup-shaped member and overflow the upper edge thereof and pass through said opening, an arm rigidly secured to said cup formed with substantially a hook member and an eyelet projecting from said frusto-conical member for accommodating said hook member whereby said cup-shaped member is removably held in position.

In testimony whereof I have signed my name to this specification in the presence of two subscribing witnesses.

JOSEPH WILLIAM MÜLLER.

Witnesses:
  FLOYD M. HANCOCK,
  GUS T. THACKER.